Sept. 17, 1957 P. F. M. GLOESS 2,807,016

SOUNDING DEVICE USING ELECTROMAGNETIC WAVES

Filed Sept. 22, 1938 2 Sheets-Sheet 1

INVENTOR
P. F. M. GLOESS
BY [signature]
ATTORNEY

INVENTOR
P. F. M. GLOESS
BY E. D. Phinney
ATTORNEY

United States Patent Office 2,807,016

Patented Sept. 17, 1957

2,807,016

SOUNDING DEVICE USING ELECTROMAGNETIC WAVES

Paul François Marie Gloess, Paris, France, assignor to International Standard Electric Corporation, New York, N. Y.

Application September 22, 1938, Serial No. 231,186

Claims priority, application France October 2, 1937

16 Claims. (Cl. 343—11)

The present invention relates to sounding devices utilising electromagnetic waves, and more particularly such devices primarily adapted to supply continuous altitude indications on board an aircraft, and also to detect and/or localise obstacles on the path of electro-magnetic waves.

In accordance with one feature of the invention, said electromagnetic wave sounding devices are equipped for functioning with waves the wavelength of which is very short, for example less than 50 centimetres.

In accordance with a feature of the invention, the generator and receiver portions comprising such a device are disposed to possess certain common components.

In accordance with one aspect of the invention, an electromagnetic wave sounding apparatus is disposed to fulfil alternately the two functions of generator and receiver, and may consist of an ultra-short wave tube operating at the wavelength contemplated and its associated circuits, and fed by variable periodic tensions in such a manner that it is a generator during one part of the functioning period and a receiver during another part of said period.

In accordance with a feature of the invention, the times during which the device is a generator and a receiver are very unequal; the generator function may, for example, be fulfilled only during 1/250 approximately of the total time. It results therefrom that the tube utilised may be supplied with a relatively high output power without risk of excessive heating or deterioration of the electrodes.

The invention will be disclosed in detail with reference to the attached drawings, in which.

Figure 1:
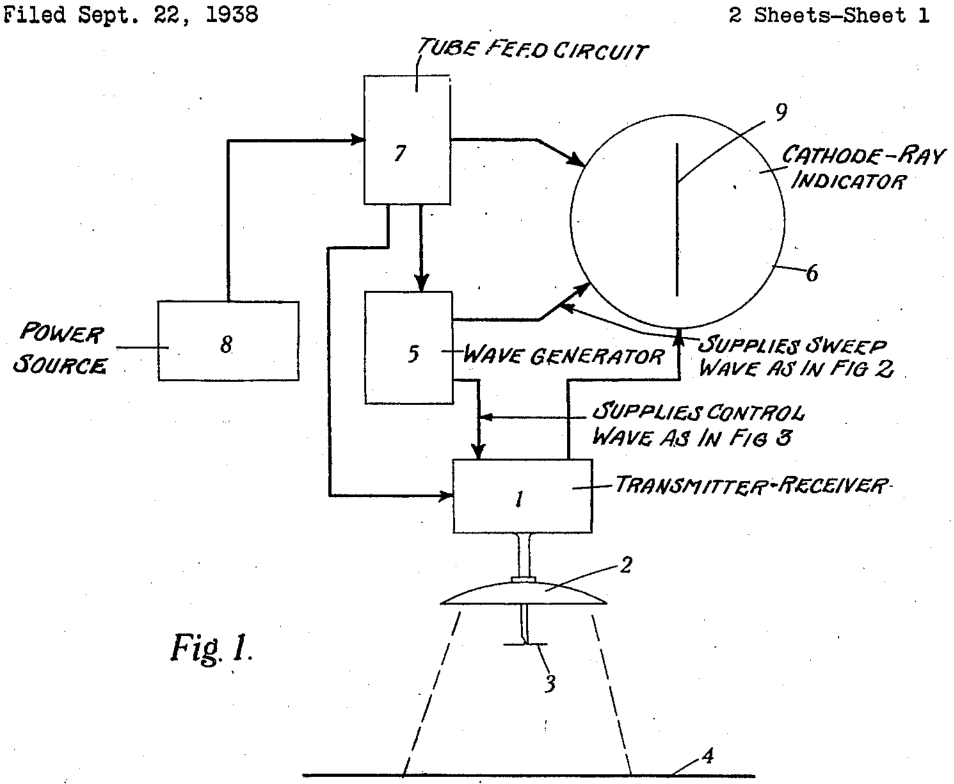
Fig. 1 represents an example of a sounding device giving the altitude of an aircraft, in accordance with certain features of the invention.

Referring to Fig. 1, the reference 1 denotes the ultra-short wave transmitter-receiver arrangement as a whole, said arrangement being connected to a suitable elevated aerial 3 associated with a reflector device 2, in order to impart to the sounding waves a certain directivity. Nevertheless, said directivity must not be too great, as then it would be possible that, under certain circumstances, the narrow ray reflected by the obstacle 4 (the ground in the case contemplated of a depth sounding arrangement for aircraft) may not strike the receiver on its return.

This transmitter-receiver arrangement is connected to a visual indicator 6, which may consist, for example, of a cathode ray tube, and to the sweep circuit of said indicator, indicated by the reference 5. The transmitter-receiver arrangement and the visual indicator are supplied with current for operating these units (currents for energizing the anode and cathode circuits) through a suitable feed circuit 7 by an arrangement of batteries or generators 8.

The cathode ray tube utilised as visual indicator may, for this use, comprise in an envelope 20 (Figure 6) in which a vacuum has been made, at one end, a thermionic cathode K, a modulation or grid electrode M, an external electrode Kc or system of electrodes or of coils in order to concentrate the pencil of electrons emitted by the cathode, a pair of deflector plates P—P or of coils for deflecting the pencil in the vertical plane, for example, and at the other end a fluorescent screen 6 of appropriate dimensions which may have a rectangular or elongated form (although it has been shown as circular), the greater dimension being in the vertical plane for depth sounding.

The luminous spot formed by the pencil of rays on the screen of the tube (which spot may have a rectangular form so as to present when stationary a thin horizontal line indication), sweeps across the screen in a very rapid cadence—for example 200,000 times per second, in the vertical direction. The speed upwards may be controlled in such a manner as to decrease in accordance with a predetermined law, for example an exponential law, and the spot returns after each upward sweep to its point of departure in a very short space of time (a fraction of a micro-second, for example).

The modulation electrode is polarised in such a manner as to attenuate strongly or even to suppress the luminosity of the mobile spot during all or part of its trajectory in the absence of received signal energy.

Figure 2:
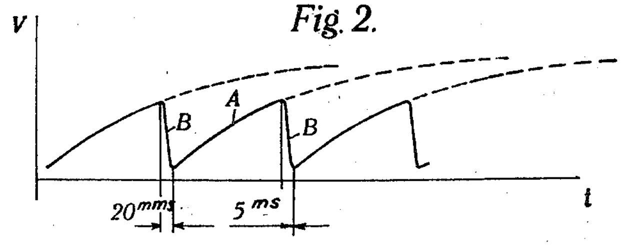
Figs. 2, 3 and 5 represent curves utilised in the explanation.
Figure 3:
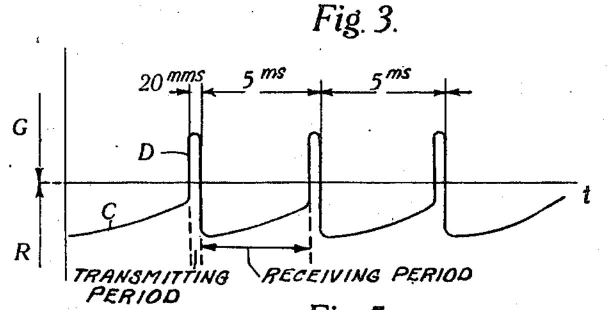

The ultra-high frequency impulse will be dispatched during each return of the cathode spot. To this end the vertical sweeping of the pencil of rays may be effected by an oscillator of the well known relaxation type wherein the potential is produced by the succession of charges and discharges of a condenser through a resistance, the rapid discharge of the condenser being effected by means of a suitable tube or tube circuit. Fig. 2 represents the curve plotted against the time $t$ of the sweep potential obtained by the foresaid device and applied to the vertical deflector system of the cathode ray tube 6. The charges of the condenser are portions A of exponential curves and, in the example selected, their individual duration is 5 micro-seconds. The discharges indicated by B have much shorter times of duration and, in the example selected, said times are equal to 20 milli-micro-seconds. The derivative in terms of the time of said signal may be applied to the transmitter-receiver 1. The curve of Fig. 3 represents, in terms of time $t$, the variation of the potential V1, derived from the sweep potential V, which controls the functioning of the transmitter-receiver arrangement. Such a result may be achieved by use of known forms of differentiating circuits or by merely the use of a transformer output. Said arrangement functions as a generator for the portions D of said curve above the time axis, therefore for the positive values of $V_1$. The letter G indicates the functioning as generator of the ultra-high frequency device. Said functioning consequently takes place only during a very short space of time, 20 milli-micro-seconds in the selected example. The receiver function, indicated by the letter R, is fulfilled by the device 1 during the periods where the tension $V_1$ is negative, i. e. during the periods of 5 micro-seconds. During said periods, as the portion C of the curve is constantly increasing, the weakening of the signals for a longer path may be compensated by the continuous increasing of the sensitivity due to said increasing of the tension. The received transmitter arrangement may be of any known type wherein a bias control serves to perform the function of switching so that the time element for this control is very short, for example, a system similar to that shown in Patent 2,144,936, January 24, 1939, issued to H. Rochow. Since, in the present case no rectification and smoothing may be required, the switching operation may be accomplished at even a higher rate than in the patent disclosure.

The signal obtained at the output of the receiver, as a result of the return of the signal transmitted, is applied to the modulation electrode of the cathode ray tube in such a manner that the spot becomes brilliant at the moment of said signal.

The time which elapses during the transmission of the impulse and the obtaining of the signal by the receiver determines the position of the luminous spot on the fluorescent screen. As, furthermore, said time is proportional to the distance of the path of the waves from the transmitter to the obstacle and back, each position of the luminous spot on the screen will correspond to a determined distance between the obstacle and the vehicle for example, to determine altitude of the aircraft in the case of a depth sounding.

The exponential law of the sweeping of the indicator tube is reproduced on the scale 9, which is preferably a logarithmic scale and, consequently, a greater precision is obtained for small distances, which in general is particularly desirable in the case of an altitude sounding on board an aircraft.

Figure 4:
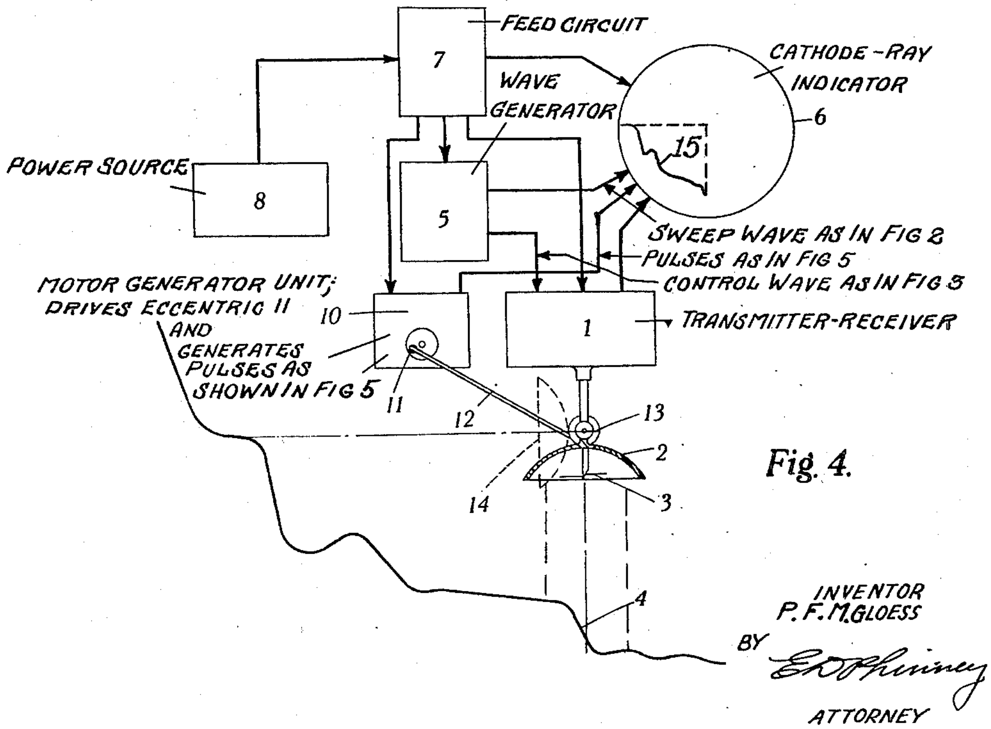
Fig. 4 represents another embodiment incorporating features of the invention.

Fig. 4 represents a further embodiment of a sounding device provided with means for swinging the beam or ray of electromagnetic sounding waves in different directions, in particular for causing the oscillation of the beam of rays in the vertical plane containing the line of route of the moving body, and between two limits. In the example illustrated, said limits are, on the one hand, the vertical position downwards and, on the other hand, a horizontal position in the direction followed by the moving body.

In this figure the same reference characters are employed for the same components as in Fig. 1. In addition, the reflector 2 and the transmitting or receiving aerial 3 are disposed to turn around a joint 13 under the control of a rod 12 connected to an eccentric 11 on the shaft of a motor, which is indicated as a whole by 10.

In order to distinguish on the screen of the indicator tube the traces emanating from the reflected wave corresponding to the successive orientations of the reflector, it is possible to employ either an additional deviation of the electronic pencil of rays of the indicator in a plane perpendicular to the first, or a combination of electrodes and/or fields giving rise to a rotation of the axis of the first deviation in the plane of the screen of the tube, for example, so that, the screen of the tube being in the vertical plane defined above, the axis of rapid frequency deviation will be parallel at any moment to the axis of the pencil of ultra-short waves received.

In this case, a possible arrangement consists in providing means for rapidly deflecting the electronic pencil from above downwards and no longer from below upwards, and for turning the axis of said sweeping around its initial position to produce angular displacements corresponding to the displacement of the antenna. The distance of said position of the luminous spot on the screen, corresponding to the return wave, depends on the distance from the earth or from the obstacle to be revealed in the direction of the axis passing through said two points, initial position and luminous spot at the time.

Figure 5:
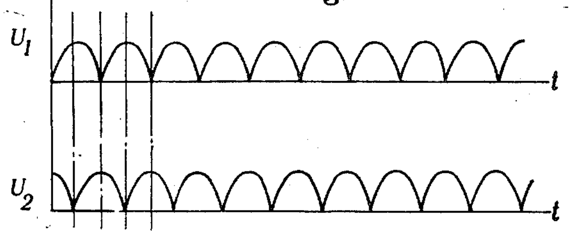
Figure 6:
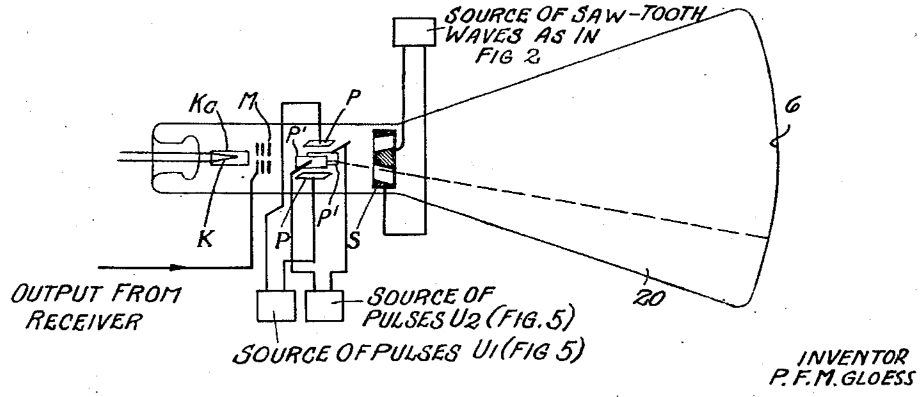
Fig. 6 represents a known cathode ray device which may be utilised in the system illustrated in Fig. 4.

By way of illustration, this particular sweeping may be obtained in the following manner:

The cathode ray tube employed as indicator may consist of a tube of the known construction as illustrated in Fig. 6, and comprising an arrangement of electron gun having a cathode K, concentration electrode Kc and modulation electrodes M, two pairs of deflector plates P—P and P′—P′ or of coils in cross formation producing a similar result, and a system of radial deviation of the pencil such as shown by S, and capable of comprising two coaxial electrodes forming an annular opening. This system of radial deviation is fed by saw-tooth potentials similar to those illustrated in Fig. 2. The ordinary cross-shaped deflector systems P—P and P′—P′ are fed by alternate sinusoidal tensions, rectified, in quadrature, such as the tensions U1 and U2 of Fig. 5, which may be produced from the rotation of the motor 10, which serves to cause to oscillate the ultra-high frequency wave radiating device. These electrodes P—P and P′—P′ cause the beam to oscillate in a quadrant in synchronism with the oscillation of the antenna due to the pulsating direct current applied thereto. Such a deflector device will give on the screen of the cathode ray tube an indication, such as 15, substantially reproducing the shape of the earth flown over by the aircraft. This operation may be more clearly understood from an explanation of the operation of the system made with reference to Figs. 4–6 inclusive. The power source, feed circuit and transmitter-receiver operate in the same manner as described above. The sweep circuit, however, is provided with a saw tooth generator for supplying the deflection voltages for electrodes S, and a further circuit for applying rectified pulsating direct current potentials in phase quadrature to the pairs of deflecting electrodes P—P and P′—P′. This voltage is derived from the generator driven by the motor 10 which oscillates the antenna 3 so that synchronism will be achieved and the oscillation of the beam will coincide with the oscillation of the antenna. The oscillation of the beam will be confined to a quadrant of the screen shown schematically in the present case as the lower left quadrant, as indicated by the dotted lines of Fig. 4.

The saw-toothed oscillations applied to electrodes S are of a high frequency compared to the frequency of oscillation of the antenna. Accordingly, a plurality of high spots corresponding to the distance of the craft from the reflecting objects will be produced on the screen so that as the antenna is displaced they will trace an outline corresponding substantially with the distance of the reflecting objects from the receiver. The initial position of the spot is presumed to be at the center of the screen, or as shown in Fig. 4 at the intersection of the quadrant line.

It is clear that numerous devices may be employed in order to cause the wave radiator arrangement to oscillate, apart from those represented merely by way of illustration. Similarly, it is clear that instead of a continuous oscillation it is possible to vary the position of said radiator assembly step-by-step, so as to obtain a succession of desired indications of distances and directions.

Devices incorporating features of the invention may employ other indicator apparatus than cathode ray tubes, and may likewise be employed as detectors and localisers of obstacles as well as for measuring the distance between two points, the speed of a vehicle or the relative speed of two vehicles.

For the sake of simplicity in the drawing, details of the arrangements of the transmitter-receiver, feeding, batteries and indicators, have not been shown, but it is clear that said various components may consist of any known suitable devices for the purposes of the invention.

It is likewise clear, although the invention has been described for the specific case of sounding intended to give the altitude or the position relatively to the earth of an aircraft, that it may also be applied to all depth sounding devices on board vehicles, or in terrestrial installations and on board vehicles for the measurements of localisation and of telemetry without visibility.

What is claimed is:

1. Electromagnetic wave apparatus for direction and distance finding comprising a transmitter-receiver device, a directional antenna connected thereto, means for rendering said device active alternately to transmit and receive electromagnetic waves said last named means including means for producing a saw-tooth voltage, means for deriving therefrom a voltage which is negative and positive during the portions of the saw-tooth cycle of slow amplitude change and fast amplitude change respectively and means for causing said transmitter-receiver device to be operative as a receiver during the slow amplitude change portion of the saw-tooth cycle and operative as a transmitter during the fast amplitude change portion of the saw-tooth cycle, and means for detecting the time delay between the transmission and reception of said waves.

2. Electromagnetic wave apparatus according to claim 1 wherein said time delay detecting means includes a cathode ray oscillograph tube having deflecting electrodes, a fluorescent screen, and a beam modulating electrode, means for applying said saw-tooth voltage to said deflecting electrodes to deflect said beam from an initial position across said screen at a predetermined rate for each transmitting operation of said apparatus, the operation of said deflecting means being initiated at the beginning of each transmitting operation and remaining effective during the following receiving period, and means responsive to the receipt of waves by said device for energizing said modulating electrode to increase the brilliance of the beam at the instant of receipt of said waves, thereby producing a bright spot on said screen at a point spaced from the initial position of said beam by a distance which is a function of the distance of a reflecting surface from said apparatus.

3. Electromagnetic wave direction and distance finding apparatus comprising a transmitter device, a directional antenna connected thereto, means for rendering said transmitter device active periodically to transmit electromagnetic waves, means for continuously varying the direction of transmission from said antenna to cause said sounding apparatus to be effective successively in different directions, means located adjacent said transmitter device for receiving and detecting electromagnetic waves reflected from a reflecting surface in the path of said transmitted waves, indicator means controlled by said detecting means for producing an indication on a reference line at a point spaced from a predetermined fixed reference point on said line by a distance representing the time delay between the transmission and reception of said waves, and means operating in synchronism with said second named means for shifting the angular position of said reference line about said reference point through corresponding angular variations of said transmitted waves, thereby establishing a series of indications representing the contour of a reflecting surface located in the path of said waves.

4. Direction and distance finding apparatus according to claim 3, wherein said indicator comprises a cathode ray tube including means for deflecting the beam along said reference line for each transmitting operation of said transmitter device and means responsive to the receipt of reflected waves to increase the intensity of the beam to provide an indication of the distance of the reflecting surface from said receiving means, and wherein the means for shifting the reference line or traversing path of said beam through angular variations corresponding to the angular variations of the transmitted waves comprises means for generating two series of sinusoidal direct current pulses in quadrature phase relation and in synchronism with variations in the direction of wave transmission, and means for applying said pulses to the respective pairs of deflecting plates of said cathode ray tube whereby the traversing path of said beam follows the angular variations of said transmitted waves.

5. In a direction and distance finding system comprising means for generating electromagnetic waves, radiant acting means for directively radiating said waves toward an object and for receiving waves reflected from said object, means for converting said received waves into controlling voltages, means for periodically angularly displacing said radiant acting means, an indicator comprising a cathode ray tube, control means for said cathode ray comprising means for controlling the deflection of said ray and means for controlling the intensity of said ray, sources of deflection voltages connected to said deflection control means for producing motion of the ray in at least one direction about a reference point in timed relation with said periodic angular displacement, and radial motion of said ray away from and toward said point in timed relation with said generated waves, and means for coupling said converting means to produce a distance and direction indication to at least one of said control means.

6. A direction and distance finding system comprising means for generating electromagnetic waves, an antenna system for directively radiating said waves toward an object and for receiving waves reflected from said object, driving means for angularly displacing said antenna system, a receiver coupled to said antenna system for converting the received waves into controlling voltages, a cathode ray tube, control means associated with said tube for controlling said cathode ray comprising means for controlling the deflection of said ray and means for controlling the intensity of said ray, a source of deflection voltage connected to said deflection means for producing motion of the ray in at least one direction about a reference point in synchronism with the angular displacement of said antenna system and radial motion of said ray away from and toward said point in timed relation with said generated waves, and means for coupling said receiver to at least one of said control means.

7. A direction and distance finding system comprising means for generating pulses of electromagnetic waves, an antenna system for directively radiating said waves toward an object and for receiving waves reflected from said object, driving means for angularly displacing the antenna system, a receiver coupled to said antenna system for converting the received waves into controlling voltages, a cathode ray tube, means for deflecting the ray of said tube, means for controlling the intensity of said ray, a source of deflection voltage connected to said deflecting means for producing motion of said ray in at least one direction about a reference point in synchronism with the displacement of said antenna system, means for producing radial motion of said ray away from and toward said point in synchronism with said pulses, and means for coupling said receiver to said intensity control means.

8. A radio vision device including in combination means for radiating radio energy toward a reflecting object, means for receiving said energy after reflection from said object, means for deriving directly from said reflected energy information including the angular position of said object and the distance of said object as a function of the velocity and the transit time of said energy, and an indicator for combining said information to indicate the angular position and distance of said object.

9. A radio vision device including a source of radio frequency energy, a sweep circuit generator, a control circuit connected to said source and to said sweep circuit to synchronize said source and said sweep, a radiator connected to said source to radiate said energy toward a radio energy reflecting object and along a distance coordinate and directively along an angular coordinate, a radio receiver responsive to radio energy reflected from said object, a cathode ray tube including deflecting elements for deflecting said ray along coordinates corresponding respectively to said distance and angular coordinates, means connecting said sweep circuit generator to said deflecting elements corresponding to said distance coordinate, means for synchronizing the deflection of said ray along said angular deflection coordinate with said directive radiation, and means for applying received reflected energy to said cathode ray tube to form a visible indication of said object in angular and distance coordinates.

10. A radio vision device including a source of pulses of radio frequency energy, a sweep circuit generator, a control circuit connected to said source and to said sweep circuit to synchronize said pulses and said sweep, a radiator connected to said source to radiate said energy toward a radio energy reflecting object and along a distance coordinate and directively along an angular coordinate, a radio receiver responsive to radio energy reflected from said object, a cathode ray tube including a control electrode, means for deflecting said ray along coordinates corresponding to said distance and angular coordinates, means connecting said sweep circuit generator to said deflecting means to sweep said ray along a coordinate corresponding to said distance coordinate, means for synchronizing the angular position of said distance sweep with the angular position of said directive radiation, and means for applying received reflected energy to said control electrode to form a visible indication of said object in angular and distance coordinates.

11. An apparatus for producing indications of range and direction of remote objects comprising means producing a directional beam of radio pulses, means continually oscillating said beam, means producing a radial line sweep on an oscillograph synchronized with said radio pulses, means continually oscillating said radial line sweep in synchronism with oscillation of said beam, and means producing indications on said radial line sweep responsively to pulse echoes.

12. An apparatus for producing indications of range and direction of remote objects comprising means producing a radio pulse emission at a constant rate, means producing a directional beam comprising said radio pulses, means continually oscillating said beam, means producing a radial line sweep on an oscillograph at said constant rate, means continually oscillating said radial line sweep in synchronism with oscillation of said beam, and means producing indications on said radial line sweep responsively to pulse echoes, whereby range of remote objects is represented by a measurement on said radial line sweep from said indications and whereby direction of remote objects is represented by the angular position of the radial line sweep at the instant an indication is produced thereon.

13. An apparatus for indicating range and direction of remote objects comprising means producing a directional energy emission, means rotating said directional energy emission, a cathode ray tube indicator means, means producing a radial sweep of the electron beam of said cathode ray tube indicator synchronized with said energy emission, means rotating said sweep about the face of said indicator tube in synchronism with rotation of said energy emission, means producing indications on said sweep when said energy emission impinges upon and reflects from remote objects, whereby range of said remote objects is represented by a measurement on said sweep and whereby direction of said remote objects is represented from the angular displacement of said sweep when said indications are produced thereon.

14. In an apparatus for indicating range and direction of remote objects, means producing a directional pulse emission, means continually rotating said directional pulse emission through 360°, means producing a radial sweep of the electron beam of an oscillograph synchronized with said pulse emission, means rotating said sweep about one end thereof in synchronism with rotation of said directional pulse emission, means producing indications upon said sweep whenever said pulses impinge upon and are reflected from remote objects whereby range of said remote objects is represented by a distance on said sweep measured from said indications to said one end, and whereby direction of said remote objects is represented by the angular position of said sweep when said indications are produced thereon.

15. In a radio echo detection system, a cathode ray tube indicator means, means producing a directional pulse energy emission rotatable about a directive axis, receiver means coupled to said indicator for applying the received energy reflections from said directive energy emission to the beam of said cathode ray tube indicator, means for producing a rotating deflection field for the cathode ray tube indicator to radially deflect the beam thereof in synchronism with the pulse energy emission, means for causing the radial deflection to angularly move in correspondence with the motion of the directional energy emission.

16. In a radio echo detection system, a pulse transmitter adapted to periodically release pulse energy emissions, a directional receiver for receiving said pulse energy emissions after reflection from remote objects, the direction of sensitivity of said receiver being rotatable about a directive axis, a cathode ray tube indicator means coupled to the output of said receiver to indicate the receipt of energy reflections from remote objects, cathode ray beam deflection means coupled to said indicator to produce a radial sweep of the cathode ray tube beam in synchronism with the release of said pulse energy emissions, and means for causing the radial deflection to angularly move in correspondence with the motion of the direction of sensitivity of said receiver.

References Cited in the file of this patent

UNITED STATES PATENTS

| | | |
|---|---|---|
| 1,858,931 | Langevin et al. | May 17, 1932 |
| 1,924,174 | Wolf | Aug. 29, 1933 |
| 1,979,225 | Hart | Oct. 30, 1934 |
| 1,982,271 | Turner | Nov. 27, 1934 |
| 2,045,072 | Espenschied | June 23, 1936 |
| 2,143,035 | Smith | Jan. 10, 1939 |
| 2,144,843 | Hearn | Jan. 24, 1939 |
| 2,172,395 | McSpadden | Sept. 12, 1939 |
| 2,181,568 | Kotowski | Nov. 28, 1939 |
| 2,189,549 | Hershberger | Feb. 6, 1940 |
| 2,193,361 | Rice | Mar. 12, 1940 |

FOREIGN PATENTS

| | | |
|---|---|---|
| 302,602 | Great Britain | May 30, 1929 |